(12) United States Patent
Poledna et al.

(10) Patent No.: US 10,919,524 B2
(45) Date of Patent: Feb. 16, 2021

(54) FAULT-TOLERANT COMPUTER SYSTEM FOR ASSISTED AND AUTONOMOUS DRIVING

(71) Applicant: TTTech Computertechnik AG, Vienna (AT)

(72) Inventors: Stefan Poledna, Klosterneuburg (AT); Eric Schmidt, Grosskrut (AT); Georg Niedrist, Guntramsdorf (AT); Stefan Traxler, Vienna (AT); Hermann Kopetz, Baden (AT)

(73) Assignee: TTTECH AUTO AG, Vienna (AT)

( * ) Notice: Subject to any disclaimer, the term of this patent is extended or adjusted under 35 U.S.C. 154(b) by 272 days.

(21) Appl. No.: 16/202,234

(22) Filed: Nov. 28, 2018

(65) Prior Publication Data
US 2019/0176817 A1 Jun. 13, 2019

(30) Foreign Application Priority Data
Dec. 7, 2017 (EP) .................................. 17205877

(51) Int. Cl.
*B60W 30/00* (2006.01)
*B60W 30/09* (2012.01)
(Continued)

(52) U.S. Cl.
CPC ........ *B60W 30/09* (2013.01); *B60W 30/0956* (2013.01); *B60W 50/00* (2013.01);
(Continued)

(58) Field of Classification Search
CPC .. B60W 30/09; B60W 30/0956; B60W 50/00; B60W 50/02; B60W 2554/801; B60W 2050/0006; G05D 1/0214
(Continued)

(56) References Cited

U.S. PATENT DOCUMENTS 9,481,374 B2    11/2016  Grewe et al.
9,672,095 B2 *  6/2017   Robertson ............. G06F 11/079
(Continued)

FOREIGN PATENT DOCUMENTS

WO      2016162624 A1    10/2016

OTHER PUBLICATIONS

Andrea Piovesen et al., "Experience with ISO 26262 ASIL Decomposition", 8th Automotive SPIN, Italia Workshop (Feb. 17, 2011), Milano, Italy, pp. 1-27.
(Continued)

*Primary Examiner* — James M McPherson
*Assistant Examiner* — Tiffany P Ohman
(74) *Attorney, Agent, or Firm* — Eversheds Sutherland (US) LLP

(57) ABSTRACT

A fault-tolerant computer system (FTCS) for generating safe trajectories for a vehicle. The FTCS includes: a sensor part (SENSE), a primary part (PRIM), a secondary part (SEC), a tertiary part (TER), and a decide part (DECIDE). The PRIM and TER are configured to produce trajectories by interpreting information of the real world as perceived by the SENSE. The SEC is configured to produce a safe space estimate (FSE) by interpreting information of the real world as perceived by SENSE. The DECIDE and/or SEC are configured to execute correctness checks that take trajectories and FSE as inputs, and qualify a trajectory (TRJ) as safe when said TRJ is inside the FSE, and qualify a trajectory (UTRJ) as unsafe when said UTRJ is not inside the FSE.

8 Claims, 5 Drawing Sheets

(51) Int. Cl.
*B60W 30/095* (2012.01)
*B60W 50/02* (2012.01)
*B60W 50/00* (2006.01)
*G05D 1/02* (2020.01)

(52) U.S. Cl.
CPC ........... *B60W 50/02* (2013.01); *G05D 1/0214* (2013.01); *B60W 2050/0006* (2013.01); *B60W 2554/801* (2020.02)

(58) Field of Classification Search
USPC ......................................................... 701/25
See application file for complete search history.

(56) References Cited

U.S. PATENT DOCUMENTS 10,407,096 B2 * 9/2019 Moretti .............. B62D 15/0265
2018/0052453 A1 * 2/2018 Poledna ............... G05B 19/042

OTHER PUBLICATIONS

European Search Report for European Application No. 17205877 dated Jun. 18, 2018.

\* cited by examiner

FAULT-TOLERANT COMPUTER SYSTEM FOR ASSISTED AND AUTONOMOUS DRIVING

CROSS-REFERENCE TO RELATED APPLICATIONS

This application claims priority to European Patent Application No. 17205877.8, filed Dec. 7, 2017, which is incorporated herein by reference.

DESCRIPTION

The invention relates to a fault-tolerant computer system for generating safe trajectories for a vehicle, wherein the fault-tolerant computer system comprises at least the following parts: a sensor part, a primary part, a secondary part, a tertiary part, and an decide part, wherein the primary part and the tertiary part are configured to produce trajectories by interpreting information of the real world as perceived by the sensor part, and wherein the secondary part is configured to produce a safe space estimate by interpreting information of the real world as perceived by the sensor part, and wherein the decide part and/or the secondary part are configured to execute correctness checks that take trajectories and the safe space estimate as an input, and qualify a trajectory taken for said correctness check as safe when said trajectory is inside the safe space estimate, and qualify a trajectory taken for said correctness check as unsafe when said trajectory is not inside the safe space estimate.

The method and computer system disclosed is in the area of advanced driver assistance systems (ADAS) and autonomous driving (AD) systems for vehicles. Such vehicles can be automobiles as well as other road-side vehicles (e.g., busses, trucks, etc.) and off-highway and duty vehicles (e.g., tractors, snow-groomers, etc). The invention discloses a method and computer system to calculate trajectories for said vehicles. Said trajectories can then be used by the vehicle to fully-autonomously or semi-autonomously (i.e., under supervision of a human passenger) maneuver along said trajectory. The computer system according to the invention will repeatedly calculate said trajectories, for example, the computer system may generate said trajectories every Y milliseconds, with Y≥1.

Since parts of an ADAS/AD system may become faulty, (e.g., random hardware failures, software development failures, etc.) it is imperative to design the overall ADAS/AD system in such a way that the faulty parts of the system do not result in a failure of the overall ADAS/AD system. In particular, such a failure of the ADAS/AD system could cause an unsafe trajectory, i.e., a trajectory if followed by the vehicle would lead to an incident, e.g., a crash with another vehicle on the road. Thus, the invention discloses a method and computer system to tolerate the failure of parts of an ADAS/AD system such that even in presence of a faulty part or faulty parts of the ADAS/AD system it is guaranteed that the vehicle will not follow unsafe trajectories.

For vehicles in general and automobiles in particular safety standards (which are typically application domain specific) need to be satisfied. This is usually a prerequisite for a vehicle to be permitted access to public road infrastructures (although there are exceptions for testing purposes). For the automotive domain the relevant safety standard is ISO 26262 which defines Automotive Safety Integrity Levels (ASIL) where the levels are QM, ASIL A, ASIL B, ASIL C, and ASIL D. It is commonly accepted that an ADAS/AD system as characterized above (e.g., fully-autonomous operation) must satisfy ASIL D. However, this does not imply that that all parts of the ADAS/AD system must be ASIL D, as well. Indeed, it is expected that some of the parts of the ADAS/AD system cannot fulfill ASIL D under reasonable cost constraints. While the ISO 26262 defines basic rules and options on how an overall system with a goal of ASIL D can be constructed by parts not being ASIL D (i.e., "ASIL decomposition"), these rules and options are generic and do not allow a direct calculation of the required ASIL levels for the parts of an actual system. Indeed, the proper design of ADAS/AD including the proper assignment of ASIL levels is one of the major hurdles of series production of fully-autonomous vehicles as of the time of this writing. Thus, this invention discloses concrete assignments of ASIL levels to parts of the computer system, which is either a ADAS/AD system by itself or is part of or a more complex ADAS/AD system.

It is an objective of the invention to disclose a computer system for an ADAS/AD system to tolerate failures of parts of said ADAS/AD systems.

This objective is achieved with a fault-tolerant computer system as mentioned above, wherein the sensor part or at least a part of said sensor part is developed according to an ASIL level of: QM, or ASIL A, or ASIL B, and the primary part is developed according to an ASIL level of: QM, or ASIL A, or ASIL B, and the secondary part is developed according to an ASIL level of: ASIL B, or ASIL C, or ASIL D, and the tertiary part is developed according to an ASIL level of: ASIL B, or ASIL C, or ASIL D, and the decide part of the fault-tolerant computer system FTCS is developed according to an ASIL level of: ASIL D.

In contrast to the state-of-the-art the present invention discloses concrete ASIL level assignments for the parts of said computer system. Hence, the invention enables the certification of the ADAS/AD system of a vehicle according to the ISO 26262 standard and, consequently, enables series production of fully-autonomous and semi-autonomous vehicles for operation on public road infrastructures.

The computer system disclosed according to the invention conceptually comprises a sensors part, a primary part, a secondary part, a tertiary part, and a decide part. The sensors part interfaces with the real world by implementing various sensors, such as real-time video cameras, radio detection and ranging (RADAR), ultra-sonic sensors, light detection and ranging (LIDAR) sensors, or any other form of sensor that allows to perceive the real world. The sensors part provides some or all of the sensor input and/or pre-processed sensor input to the primary, to the secondary, and to the tertiary parts. The primary part as well as the tertiary part repeatedly calculate trajectories for the vehicle.

The secondary part is capable to repeatedly generate a safe space estimate, which is a representation of a geographically region that is presumably safe to move into. The generation of the trajectories of the primary and tertiary part are aligned with the generation of the safe space estimate in the secondary part. For example, the generation of the trajectories and the safe space estimate may be periodic with equal or harmonic periods. An example of a safe space estimation is given in FIG. 4.

The secondary part and/or the decide part is/are capable of checking trajectories with respect to defined correctness criteria. The primary part and the tertiary part provide the trajectories which they calculate to the decide part. The secondary part provides the generated safe space estimate to the decide part and may provide the results of its optional correctness checks to the decide part and may also provide the trajectories received from the primary part and tertiary part to the decide part as well. The decide part then may optionally execute correctness checks and selects either the trajectory from the primary part or the trajectory from the tertiary part and outputs the selected trajectory to the overall ADAS/AD system or the vehicle itself. The ADAS/AD system or the vehicle will translate the trajectory into commands for the actuators of the vehicle, such that the vehicle moves along the trajectory that the decide part outputs.

Advantageous embodiments of the fault tolerant system described may comprise one, more or all of the following details:

The secondary part and/or the decide part may be configured to execute correctness checks on trajectories provided by the primary part and/or provided by the tertiary part.

The decide part may be configured to provide a trajectory from the primary part as safe trajectory to the vehicle when said trajectory is inside the safe space estimate as generated by the secondary part.

The decide part may be configured to provide a trajectory from the tertiary part to the vehicle when said trajectory provided by the primary part is not inside the safe space estimate as generated by the secondary part and/or the primary part does not provide a trajectory at all.

Since the trajectories and the safe space estimate are calculated repeatedly the decide part may not immediately provide the trajectory from the tertiary part, but may only start to provide trajectories from the tertiary part to the vehicle in the case that a configurable first number of trajectories provided by the primary part are repeatedly not inside the safe space estimates as generated by the secondary part and/or the primary part does not provide a configurable second number of trajectories at all.

Said first configurable number may be 1 and said second configurable number may be ≥1.

The primary part may conform to QM as defined in the ISO 26262 standard and the secondary part may conform to ASIL D as defined in the ISO 26262 standard.

The primary part may conform to ASIL A as defined in the ISO 26262 standard and the secondary part may conform to ASIL C as defined in the ISO 26262 standard.

The primary part may conform to ASIL B as defined in the ISO 26262 standard and the secondary part may conform to ASIL B as defined in the ISO 26262 standard.

In the following, in order to further demonstrate the present invention, illustrative and non-restrictive embodiments are discussed, as shown in the drawings, which show:

FIG. 1 an example of a fault-tolerant computer system,

FIG. 2 another example of a fault-tolerant computer system,

FIG. 3 an example of a safe trajectory,

FIG. 4 an example of a safe space estimate, and

FIG. 5 an example of an unsafe trajectory.

We discuss some of the many implementations of the invention next. If not stated otherwise, all details described in connection with a specific example are not only valid in connection with this example, but apply to the general scope of protection of the invention.

If not stated otherwise, the method and system presented below preferably is exercised repeatedly, typically with a fixed period, e.g. a couple of milliseconds.

FIG. 1 depicts an example of a fault-tolerant computer system FTCS. The fault-tolerant computer system FTCS conceptually consists of a sensors part SENSE, a primary part PRIM, a secondary part SEC, a tertiary part TER, and a decide part DECIDE. The sensors part SENSE interfaces with the real world by implementing various sensors, such as real-time video cameras, radio detection and ranging (RADAR), ultra-sonic sensors, light detection and ranging (LIDAR) sensors, or any other form of sensor that allows to perceive the real world. The perception of the real world by means of one, two, or a multitude of sensors in the sensors part SENSE is depicted by reference sign IN-SENSE.

The sensors part SENSE provides some or all of the sensor input and/or pre-processed sensor input to the primary part PRIM, secondary part SEC, and tertiary part TER. The information flow from the sensors part SENSE to the primary part PRIM, secondary part SEC, and tertiary part TER is depicted by reference signs IN-PRIM, IN-SEC, IN-TER. Said information flow is enabled for example by directly connecting sensors from the sensors part SENSE to one, two, or all of the primary part PRIM, secondary part SEC, and tertiary part TER. Alternative or in addition to the direct connection the sensors part SENSE may connect to one, two, or all of the primary part PRIM, secondary part SEC, and tertiary part TER by means of a communication network, such as Ethernet, or PCIe (PCI express).

The primary part PRIM as well as the tertiary part TER calculate trajectories for a vehicle. The secondary part SEC is capable to generate a safe space estimate, which is a representation of a geographically region that is presumably safe to move into. An example of a safe space estimation FSE is given in FIG. 4.

The secondary part SEC and/or the decide part DECIDE is/are capable of checking trajectories with respect to one or more defined correctness criteria. Such correctness criteria are for example checks on whether the provided trajectory is entirely in a safe space estimate FSE whether the provided trajectory satisfies given constraints on the curvature, speed, and/or acceleration/deacceleration whether the provided trajectory adheres to legal frameworks, e.g., speed limits, etc.

whether the provided trajectory adheres to rules as specified by the vehicle manufacturer or by a supplier of the vehicle manufacturer The primary part PRIM provides the trajectories that it calculates to the decide part DECIDE by means of an interface OUT1-PRIM and may provide the trajectory it generates also to the secondary part SEC by means of an optional interface OUT2-PRIM.

In a first case, the primary part PRIM provides the trajectory only to the DECIDE part, and not to the secondary part SEC, and the secondary part provides its safe space estimate FSE to the DECIDE part as well. In this first case, it is the DECIDE part that executes said correctness checks by using the provided trajectory from the primary part PRIM and the safe space estimate from the secondary part SEC as inputs.

In a second case, the primary part PRIM provides the trajectory to the DECIDE part and also to the secondary part SEC. In this second case it may be the secondary part SEC that is to execute said all or one, two, or a multitude of correctness checks by using the trajectory as provided by the primary part PRIM and its generated safe space estimate FSE as input. In this second case, the secondary part SEC may provide only the result of the correctness check/s and/or the trajectory as provided from the primary part PRIM to the decide part DECIDE.

The secondary part SEC interacts with the DECIDE part using interface OUT1-SEC.

The tertiary part TER provides the trajectories it calculates to the DECIDE part, by using interface OUT1-TER.

The decide part DECIDE then selects either the trajectory from the primary part PRIM or the trajectory from the tertiary part TER and outputs the selected trajectory on an interface OUT-DECIDE. One way of said selection is that the decide part DECIDE selects the trajectory from the primary part PRIM if and only if the results of the correctness check for said trajectory from the primary part as executed by the secondary part SEC and/or the decide part DECIDE indicate that said trajectory of the primary part is correct. In all other cases, e.g., the result of the correctness check indicates that said trajectory of the primary part PRIM is not correct, the decide part DECIDE does not select said trajectory of the primary part PRIM. In case the decide part DECIDE does not select said trajectory from the primary part PRIM it may either immediately start to select trajectories from the tertiary part TER or may do so only if the correctness check or checks repeatedly indicate the trajectories from the primary part PRIM to be not correct. Furthermore, the decide part DECIDE may start to select trajectories from the tertiary part TER if the primary part PRIM fails to provide a configurable number of trajectories on the interface OUT1-PRIM, where this number is an integer 1.

All interfaces OUT1-PRIM, OUT2-PRIM, OUT1-SEC, OUT1-TER, OUT2-TER may be directly connecting said parts to each other or may connect said parts to each other by usage of a communication network such as Ethernet, PCIe, FlexRay, TTP, CAN, LIN, or any other networking technology.

The sensor part SENSE or parts of said sensors part SENSE of the fault-tolerant computer system FTCS is developed according to an ASIL level of: QM, or ASIL A, or ASIL B.

The primary part PRIM of the fault-tolerant computer system FTCS is developed according to an ASIL level of: QM, or ASIL A, or ASIL B.

The secondary part SEC of the fault-tolerant computer system FTCS is developed according to an ASIL level of: ASIL B, or ASIL C, or ASIL D.

The tertiary part TER of the fault-tolerant computer system FTCS is developed according to an ASIL level of: ASIL B, or ASIL C, or ASIL D.

The decide part DECIDE of the fault-tolerant computer system FTCS is developed according to an ASIL level of: ASIL D.

Within the ASIL characterization as defined above, the following three concrete combinations of ASIL part levels are of particular relevance:
In a first combination, the primary part PRIM is QM and the secondary part SEC is ASIL D.
In a second combination, the primary part PRIM is ASIL A and the secondary part SEC is ASIL C.
In a third combination, the primary part PRIM is ASIL B and the secondary part SEC is ASIL B.

FIG. 2 extends the method and fault-tolerant computer system as described under FIG. 1, with an additional interface OUT2-TER that connects the tertiary part TER to the secondary part SEC. The tertiary part TER can use the interface OUT2-TER to also provide some or all of the trajectories it generates to the secondary part SEC. The secondary part SEC can then apply one correctness check or more correctness checks, for example all or some of the correctness checks mentioned above, also on the trajectories provided by the tertiary part TER and inform the decide part DECIDE of the results of said execution of said correctness checks.

Figure 1:
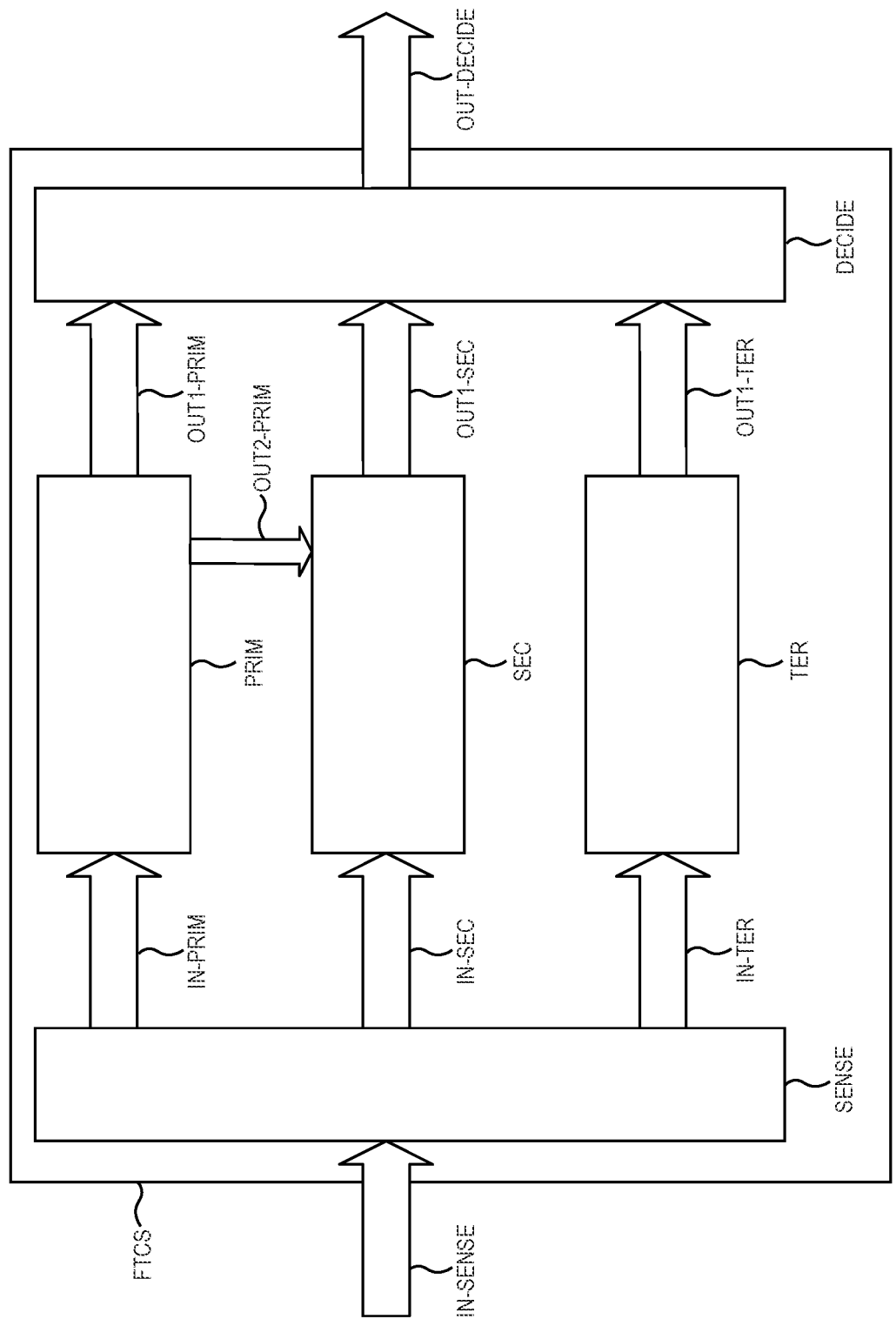
Figure 2:
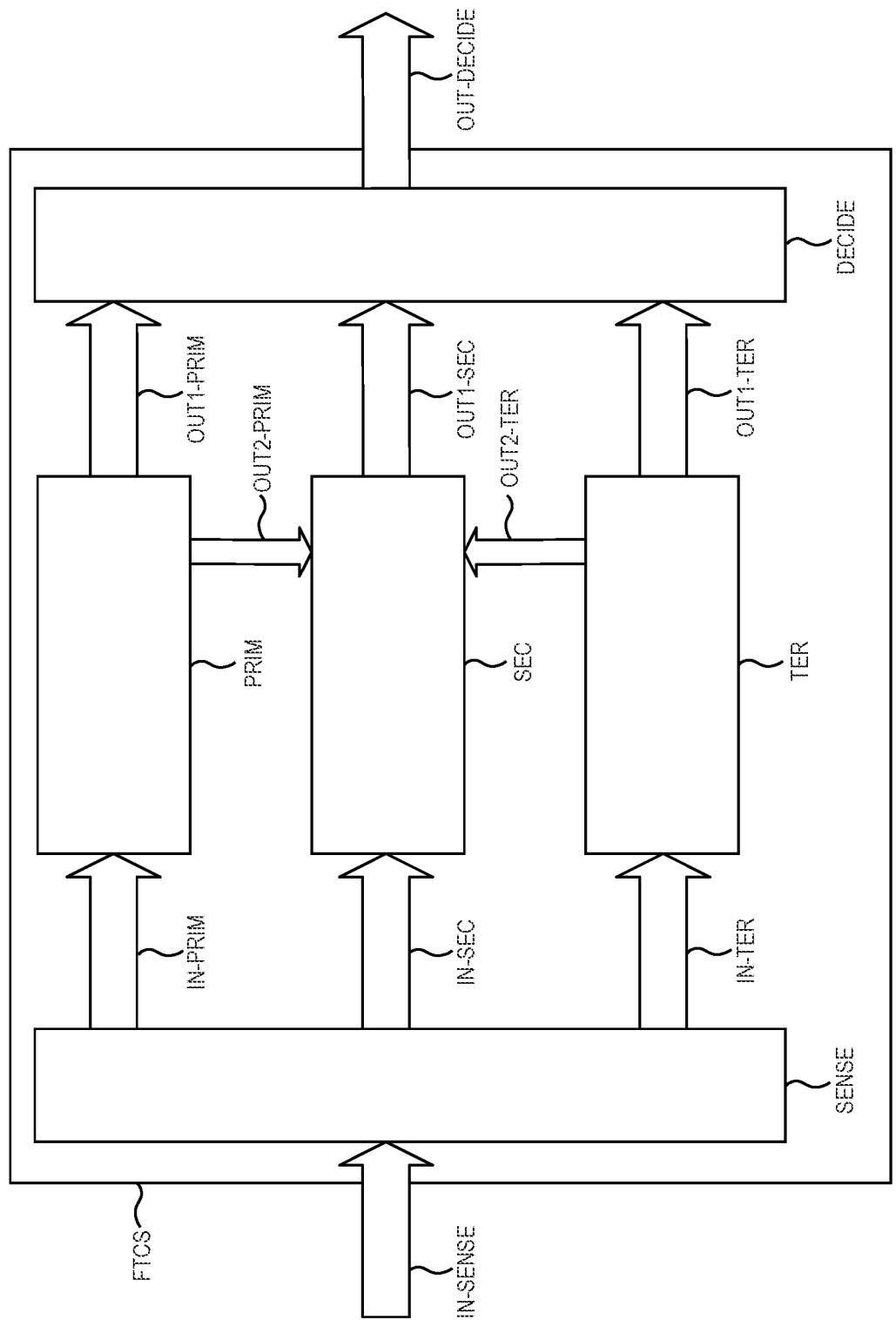
Figure 3:
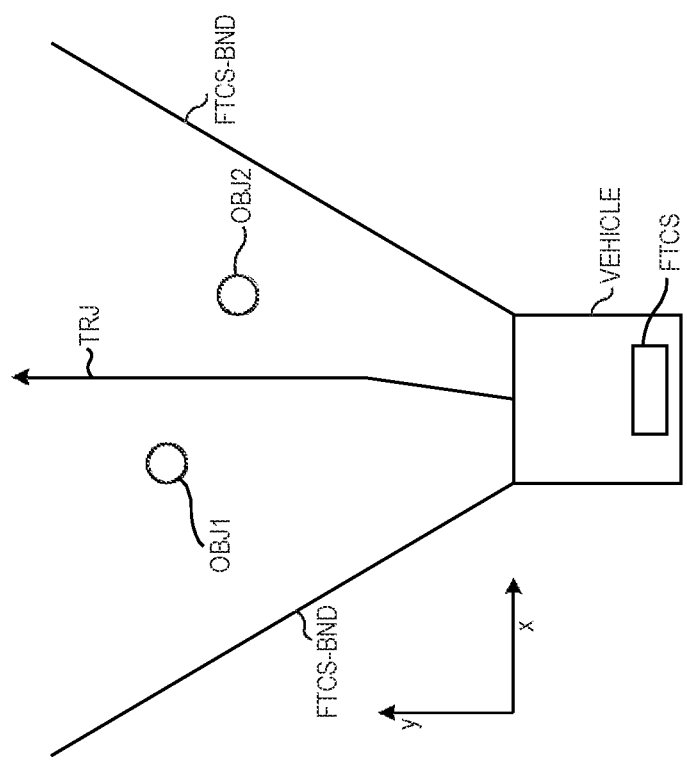
FIG. 3 depicts a safe trajectory TRJ as calculated by the fault-tolerant computer system FTCS along which safe trajectory TRJ the vehicle VEHICLE may move. It is safe in a sense that it does not cause the vehicle to interfere with objects, e.g., objects OBJ1, OBJ2 and stays within perceived boundaries FTCS-BND.
Figure 4:
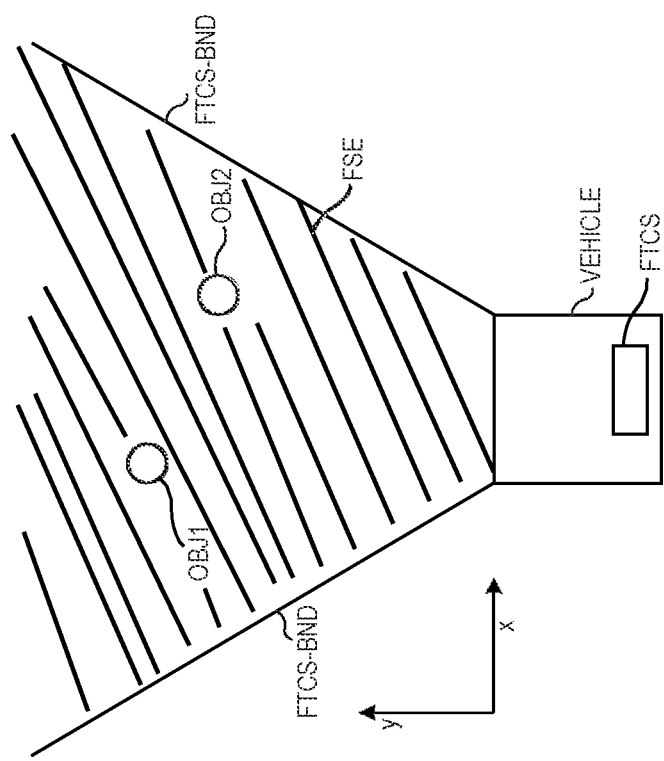
FIG. 4 depicts an example of a safe space estimate FSE.
Figure 5:
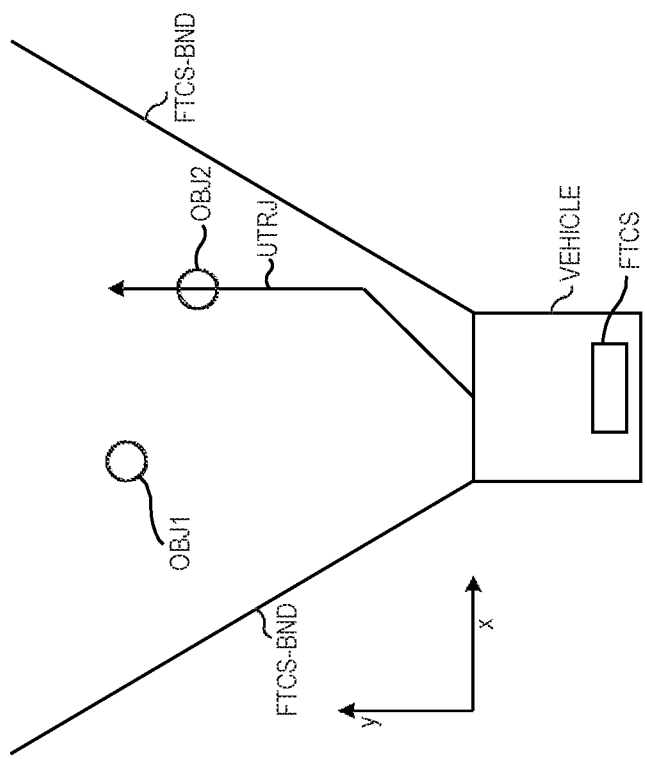

FIG. 5 depicts an example of an unsafe trajectory. In this case the trajectory UTRJ would cause the vehicle VEHICLE to collide with object OBJ2 if the vehicle were to follow said unsafe trajectory UTRJ. It is the objective of this invention of ensure that the presented fault-tolerant computer system will never produce an unsafe trajectory UTRJ on its interface OUT-DECIDE.

The invention claimed is:

1. A fault-tolerant system for generating safe trajectories for a vehicle, the fault-tolerant system comprising:
   one or more computers comprising:
      a sensor part;
      a primary part;
      a secondary part;
      a tertiary part; and
      a decide part,
   wherein the primary part and the tertiary part are configured to produce trajectories by interpreting real world information as perceived by the sensor part,
      wherein the secondary part is configured to produce a safe space estimate by interpreting the real world information as perceived by the sensor part,
      wherein the decide part and/or the secondary part are configured to execute correctness checks that take the trajectories and the safe space estimate as inputs and qualify a trajectory of the trajectories as safe when said trajectory is inside the safe space estimate and unsafe when said trajectory is not inside the safe space estimate,
      wherein the one or more computers are configured to cause the vehicle, based on the trajectory being qualified as safe, to fully-autonomously or semi-autonomously maneuver along the trajectory,
      wherein the sensor part is developed according to an ASIL level of: a QM level, an ASIL A level, or an ASIL B level,
      wherein the primary part is developed according to the ASIL level of: the QM level, the ASIL A level, or the ASIL B level,
      wherein the secondary part is developed according to the ASIL level of: the ASIL B level, an ASIL C level, or an ASIL D level,
      wherein the tertiary part is developed according to the ASIL level of: the ASIL B level, the ASIL C level, or the ASIL D level, and
      wherein the decide part is developed according to the ASIL level of: the ASIL D level.

2. The fault-tolerant system (FTCS) according to claim 1, wherein the secondary part and/or the decide part are configured to execute the correctness checks on the trajectories provided by the primary part and/or the tertiary part.

3. The fault-tolerant system according to claim 1, wherein the decide part is configured to provide the trajectory from the primary part as being safe when said trajectory is inside the safe space estimate as generated by the secondary part.

4. The fault-tolerant system according to claim 1, wherein the decide part is configured to provide the trajectory from the tertiary part to the vehicle when: (i) the trajectory or a configurable first number of trajectories provided by the primary part is not inside the safe space estimate as generated by the secondary part; and/or (ii) the primary part does not provide the trajectory or a configurable second number of trajectories at all.

5. The fault-tolerant system according to claim 4, wherein said first configurable number of trajectories is $\geq 1$ and said second configurable number of trajectories is $\geq 1$.

6. The fault-tolerant system according to claim 1, wherein the primary part conforms to the QM level as defined in ISO 26262 standard and the secondary part conforms to the ASIL D level as defined in the ISO 26262 standard.

7. The fault-tolerant system according to claim 1, wherein the primary part conforms to the ASIL A level as defined in ISO 26262 standard and the secondary part conforms to the ASIL C level as defined in the ISO 26262 standard.

8. The fault-tolerant system according to claim 1, wherein the primary part conforms to the ASIL B level as defined in ISO 26262 standard and the secondary part conforms to the ASIL B level as defined in the ISO 26262 standard.

* * * * *